(12) United States Patent
Lee

(10) Patent No.: US 7,834,863 B2
(45) Date of Patent: Nov. 16, 2010

(54) STYLUS PEN COMBINED WITH ANTENNA IN PORTABLE WIRELESS TERMINAL

(75) Inventor: Jun-Seong Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 944 days.

(21) Appl. No.: 11/211,862

(22) Filed: Aug. 25, 2005

(65) Prior Publication Data
US 2006/0055686 A1    Mar. 16, 2006

(30) Foreign Application Priority Data
Sep. 10, 2004    (KR) ............... 10-2004-0072395

(51) Int. Cl.
G09G 5/00    (2006.01)
(52) U.S. Cl. ....................... 345/179; 343/893
(58) Field of Classification Search ............... 345/179; 343/702, 723, 700 MS
See application file for complete search history.

(56) References Cited

U.S. PATENT DOCUMENTS

| 4,868,576 | A | * | 9/1989 | Johnson, Jr. ............ 343/702 |
| 5,739,793 | A | * | 4/1998 | Adachi .................... 343/702 |
| 6,104,350 | A |   | 8/2000 | Ng et al. |
| 6,262,684 | B1 | * | 7/2001 | Stewart et al. ........... 343/702 |
| 6,275,193 | B1 | * | 8/2001 | Nilsen et al. ............ 343/702 |
| 6,473,076 | B1 | * | 10/2002 | Thompson et al. ....... 345/179 |
| 6,480,159 | B1 | * | 11/2002 | Hsu ....................... 343/702 |
| 6,665,543 | B1 |   | 12/2003 | McCleary et al. |
| 7,154,486 | B2 | * | 12/2006 | Wang et al. ............. 345/179 |
| 2004/0017323 | A1 | * | 1/2004 | Martiskainen et al. ... 343/792 |
| 2005/0168383 | A1 | * | 8/2005 | Lee .................... 343/700 MS |
| 2008/0094292 | A1 | * | 4/2008 | Su ........................ 343/702 |

FOREIGN PATENT DOCUMENTS

| CN | 1157543 | 8/1997 |
| CN | 2431649 | 5/2001 |
| EP | 0 784 353 | 7/1997 |
| KR | 10-2004-0073634 | 8/2004 |

* cited by examiner

Primary Examiner—Amr Awad
Assistant Examiner—Tony Davis
(74) Attorney, Agent, or Firm—The Farrell Law Firm, LLP

(57) ABSTRACT

Disclosed is a stylus pen combined with an antenna in a touch screen type-wireless terminal. The stylus pen has a built-in antenna and is detachably disposed in the touch screen type-wireless terminal, and the built-in antenna makes electrical connection with an antenna contact portion of an RF board of the terminal when the stylus pen is completely inserted in the terminal, such that the terminal has an improved antenna radiation characteristic and quality when compared with a terminal only having a fixed terminal antenna. The built-in antenna in the stylus pen may be a λ/4 dipole antenna or a λ/4 monopole antenna.

5 Claims, 6 Drawing Sheets

STYLUS PEN COMBINED WITH ANTENNA IN PORTABLE WIRELESS TERMINAL

PRIORITY

This application claims priority under 35 U.S.C. §119 to an application entitled "Stylus Pen Served As Antenna In Portable Wireless Terminal" filed in the Korean Intellectual Property Office on Sep. 10, 2004 and assigned Ser. No. 2004-0072395, the contents of which are incorporated herein by reference.

BACKGROUND OF THE INVENTION

1. Field of the Invention

The present invention relates to a stylus pen of a portable wireless terminal such as a Personal Digital Assistant (PDA) having a touch screen type-wide Liquid Crystal Display (LCD) module, and more particularly, to a stylus pen combined with an antenna in a portable wireless terminal, the stylus pen functioning as an antenna when disposed in the terminal, such that the terminal can have an improved radiation characteristic and sensitivity without adding additional parts.

2. Background of the Prior Art

Usage of portable wireless terminals is becoming very common, and various functions and designs are being embedded in the portable wireless terminals. Although the trend is to miniaturize, reduce the weight of, and simplify the features of the terminals, there is an increasing need for the terminals to provide various functions such as basic call service, internet connection, text and graphic processing and so on. Therefore, the terminals are designed to be small in size and to have a wide display unit (i.e. wide LCD module) to satisfy customer's demand, and touch screen type terminals are being widely used without a keypad assembly to satisfy such user demand.

In the touch screen type terminal, an accessory can be used to manipulate the touch screen. For example, a stylus pen with a pointed tip, shaped like a writing instrument, can be used for touching the touch screen for data input. The stylus pen can be carried separately from the terminal or together with the terminal at a rear portion thereof. Recently, most stylus pens are detachably provided with the touch screen type terminals, to prevent loss of the stylus pen.

However, conventional systems merely use the stylus pen to facilitate touch screen data input without providing other uses for the stylus pen. Accordingly, conventional portable wireless terminals having various functions require use of additional parts to prevent antenna radiation degradation caused by Radio Frequency (RF) noise. The present invention utilizes the stylus pen to improve antenna performance.

SUMMARY OF THE INVENTION

The present invention provides a stylus pen combined with an antenna in a portable wireless terminal, the stylus pen functioning as an antenna when the stylus pen is disposed in the terminal, to improve the radiation characteristic of the terminal.

Also, the present invention provides a stylus pen combined with an antenna in a portable wireless terminal, the stylus pen improving the radiation characteristic of the terminal without adding additional parts or requiring a design change.

Further, the present invention provides a stylus pen combined with an antenna in a portable wireless terminal, the stylus pen functioning as a $\lambda/4$ dipole antenna or $\lambda/4$ monopole antenna when disposed in the terminal, to increase the sending/receiving sensitivity and reliability of the terminal.

According to an aspect of the present invention, in a touch screen type-portable wireless terminal wherein a stylus pen combined with an antenna is detachably disposed, a built-in antenna is installed in the stylus pen, with the built-in antenna making electrical connection with an antenna contact portion of an RF board of the terminal when the stylus pen is completely inserted in the terminal, to improve the terminal antenna radiation characteristic.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. A detailed description of well-known features will be omitted for conciseness.

Figure 1:
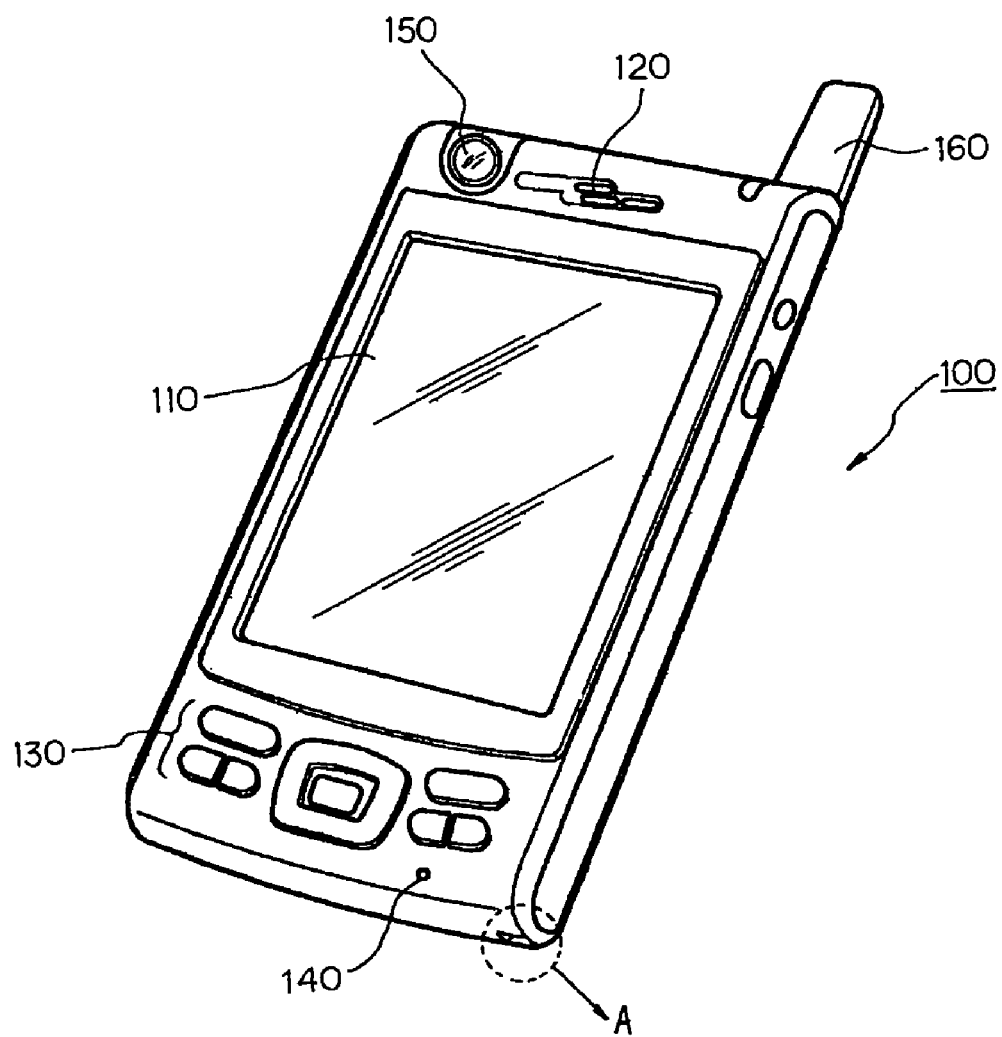
FIG. 1 is a perspective view of a touch screen type portable wireless terminal.

FIG. 1 is a perspective view of a touch screen type portable wireless terminal.

Referring to FIG. 1, though a PDA terminal 100 is illustrated, the present invention is not limited to PDA terminals. Rather, the present invention can be applied to various kinds of wireless terminals that have a detachable stylus pen for manipulating a touch screen.

The terminal 100 includes an LCD module 110 at a front, an earpiece 120 above the LCD module 110, a microphone 140 under the LCD module 110, and a helical antenna 160 (terminal antenna) protruded from a top thereof. The wide LCD module 110 is a touch screen type LCD module and preferably a color wide touch screen type LCD module. The earpiece 120 has a speaker from which a user can hear a calling partner's voice, and the microphone 140 is provided to send a user's voice to a calling partner. Though a helical antenna 160 fixed to the terminal 100 is illustrated, a whip antenna capable of extending and retracting or other type of antenna may be used, according to terminal type and required radiation characteristics. Also, the terminal 100 may include a keypad assembly 130 between the LCD module 110 and the microphone 140, the keypad assembly 130 being a numeric keypad assembly or a scroll type keypad assembly. Preferably, a navigation keypad assembly is provided. Further, the terminal 100 may include a camera module 150 at a predetermined portion of a top, for photographing and related functions.

Though the LCD module 110 covers most of the area on the front of the terminal 100, it is not easy for a user to manipulate or enter data via the LCD module 110 by a finger touch. Accordingly, a stylus pen (refer to FIG. 2) is typically provided. Recently, the stylus pen is detachably disposed in the terminal 100 to provide a convenience to the user and prevent possible loss of the stylus pen. In this embodiment, the terminal 100 has a portion (A) at one side of a bottom to accommodate the stylus pen. The stylus pen is inserted into the portion (A) with its tip pointing upward. Those of skill in the art will recognize that the installing structure of the stylus pen is not limited to above-mentioned structure; and that various structure can allow the stylus pen to serve as an antenna when the stylus pen is fully disposed in the terminal.

Figure 2:
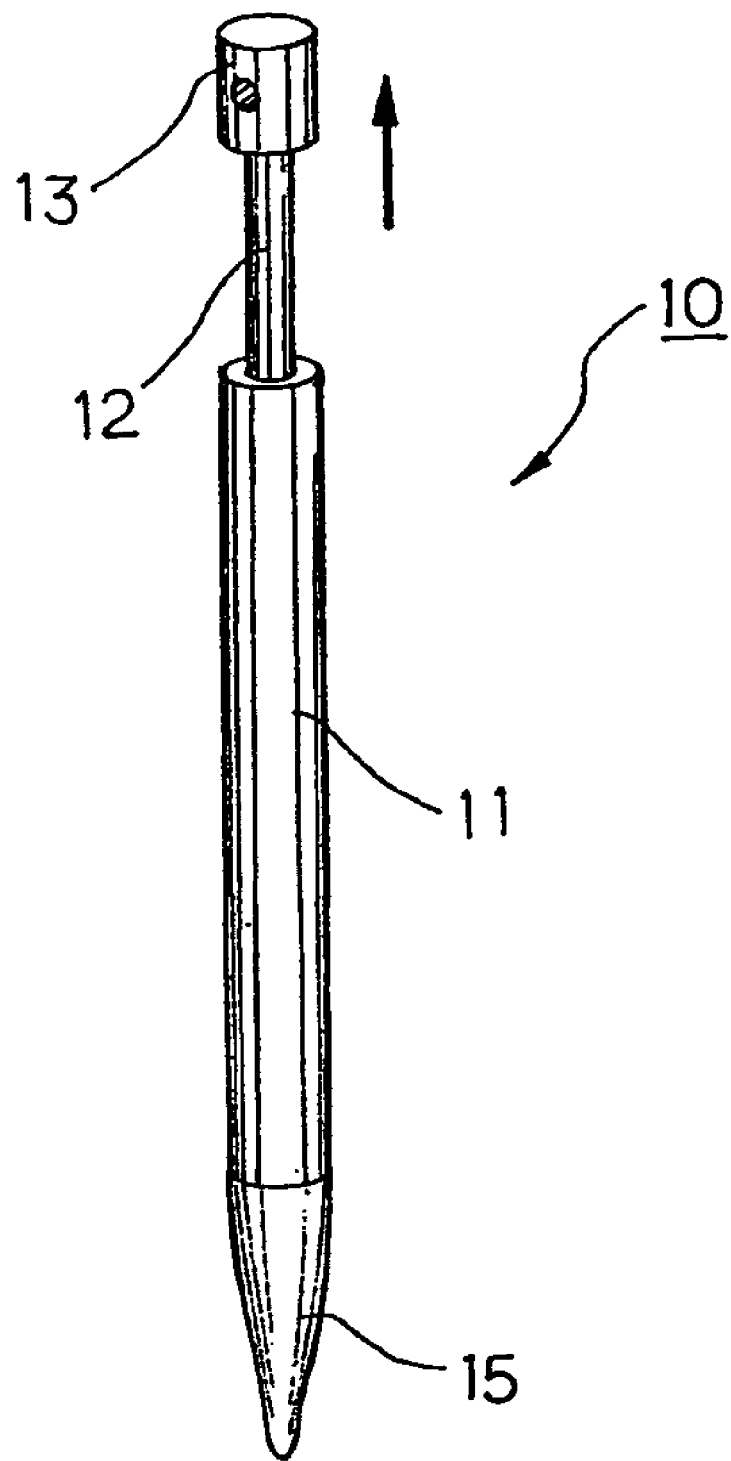
FIG. 2 is a perspective view of a stylus pen according to the present invention.
Figure 3:
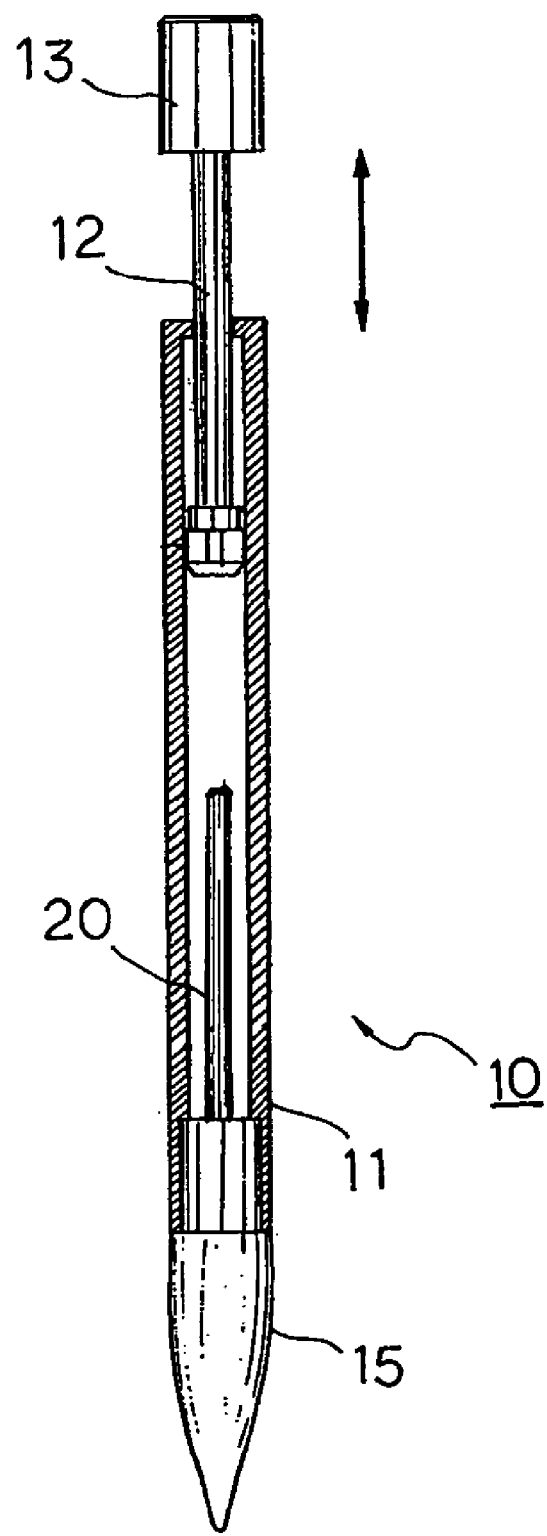
FIG. 3 is a cut-away view of a stylus pen according to the present invention.

FIG. 2 is a perspective view of a stylus pen according to the present invention, and FIG. 3 is a cut-away view of a stylus pen according to the present invention.

Referring to FIGS. 2 and 3, a stylus pen 10 includes a hollow cylinder 11, a shaft 12 having a head 13, and a tip 15 at an end opposite to the head 13. The shaft 12 is disposed in the hollow cylinder 11 and in a preferred embodiment is capable of extending and retracting motions therein. The tip 15 has a cone shape with a round smooth end, such that a user can easily manipulate the touch screen of the terminal 100 with the stylus pen 10 without damaging the screen. A built-in antenna 20 is installed in the hollow cylinder 11. Preferably, a λ/4 dipole antenna or λ/4 monopole antenna, having a good radiation characteristic, can be used as the built-in antenna 20. The built-in antenna 20 may be electrically connected with the tip 15, preferably by molding one end in the tip 15. The shaft 12 having the head 13 may extend and retract in the hollow cylinder 11 without interference with the built-in antenna 20. Since the tip 15 should make electrical connection with an antenna contact portion of an RF board of the terminal 100 when the stylus pen 10 is completely disposed in the terminal 100, the tip 15 of the stylus pen 10 is entirely or partially made of conductive material, or is at least capable of making an electrical connection between the antenna contact portion of an RF board of the terminal and the built-in antenna 20.

Figure 4:
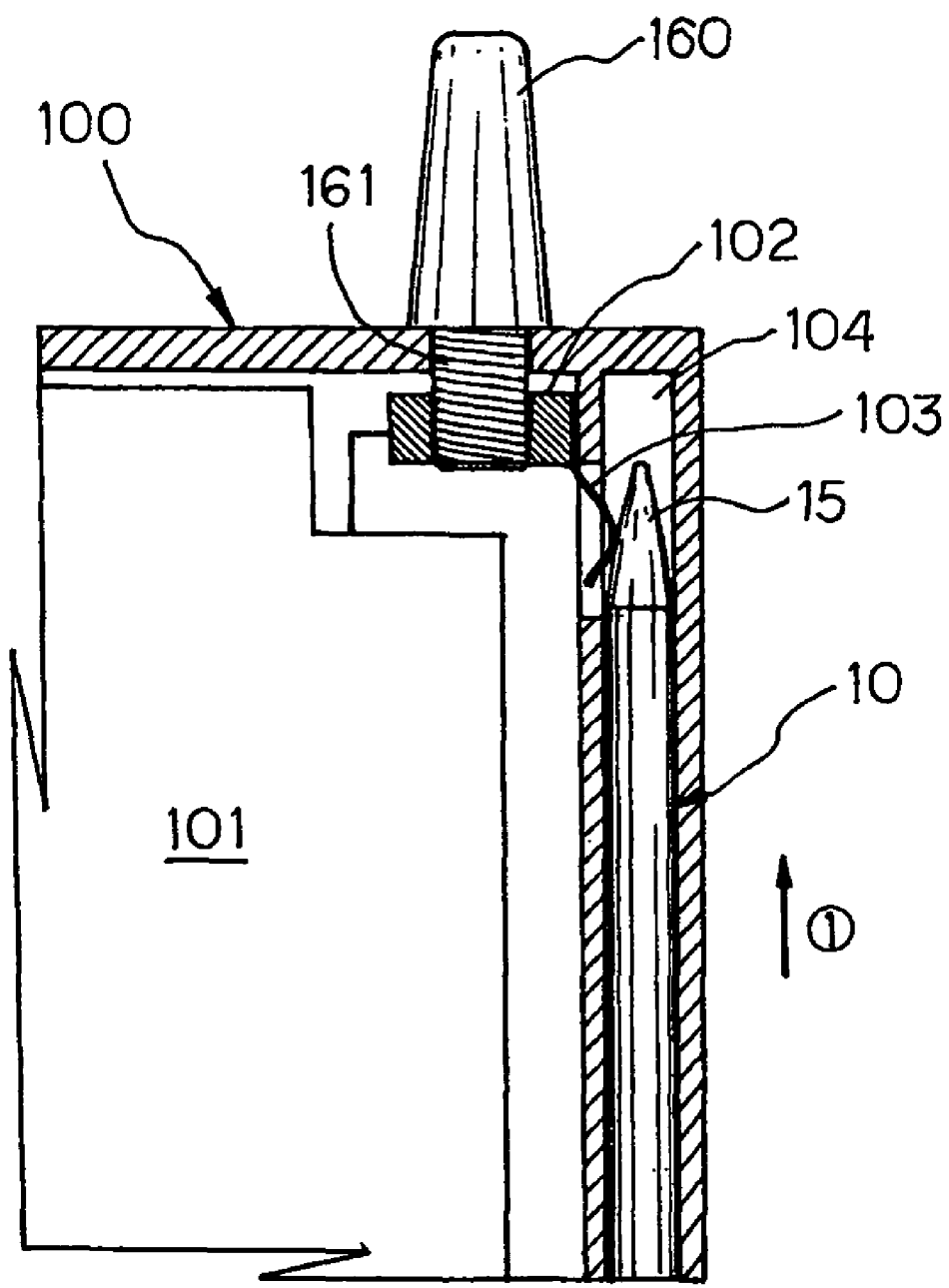
FIG. 4 is a partial cut-away sectional view showing a stylus pen disposed in a terminal according to an embodiment of the present invention.

FIG. 4 is a partial cut-away sectional view showing a stylus pen disposed in a terminal according to an embodiment of the present invention.

Referring to FIG. 4, the terminal 100 includes the well-known helical antenna 160 having a threaded portion 161. The threaded portion 161 may be coupled with a metal bushing 102, which is electrically connected with an antenna contact portion of an RF board 101 of the terminal 100. Therefore, the threaded portion 161 of the helical antenna 160, the metal bushing 102, and the RF board 101 are electrically connected in series.

A recess 104 may be defined in the terminal 100 at a location near the helical antenna 160, for inserting and accommodating the stylus pen 10. A well-known stopping element (not shown), such as a protrusion and a tight fitting groove, may be formed to hold the stylus pen 10 when the stylus pen 10 is completely inserted in the recess 104. When the stylus pen 10 is completely inserted in a predetermined direction (refer to an arrow ① in FIG. 4), the tip 15 of the stylus pen 10 is electrically connected with the helical antenna 160 and the antenna contact portion of the RF board 101. In FIG. 4, shown is a contact spring 103 having one end fixed to the metal bushing 102 and another free end located in the recess 104, such that the tip 15 of the stylus pen 10 comes into contact with the contact spring 103 when the stylus pen 10 is completely inserted in the terminal 100. Though the contact spring 103 is used to electrically connect the tip 15 and the antenna contact portion of the RF board 101, other well-known connection means can be used for the same purpose.

When the stylus pen 10 is not inserted in the terminal 100, the helical antenna 160 fixed to the terminal 100 functions as the only antenna. However, when the stylus pen 10 is completely inserted into the terminal 100, the built-in antenna 20 of the stylus pen 10 as well as the helical antenna 160 can function as an antenna, such that the radiation characteristics of the terminal can be improved.

Figure 5:
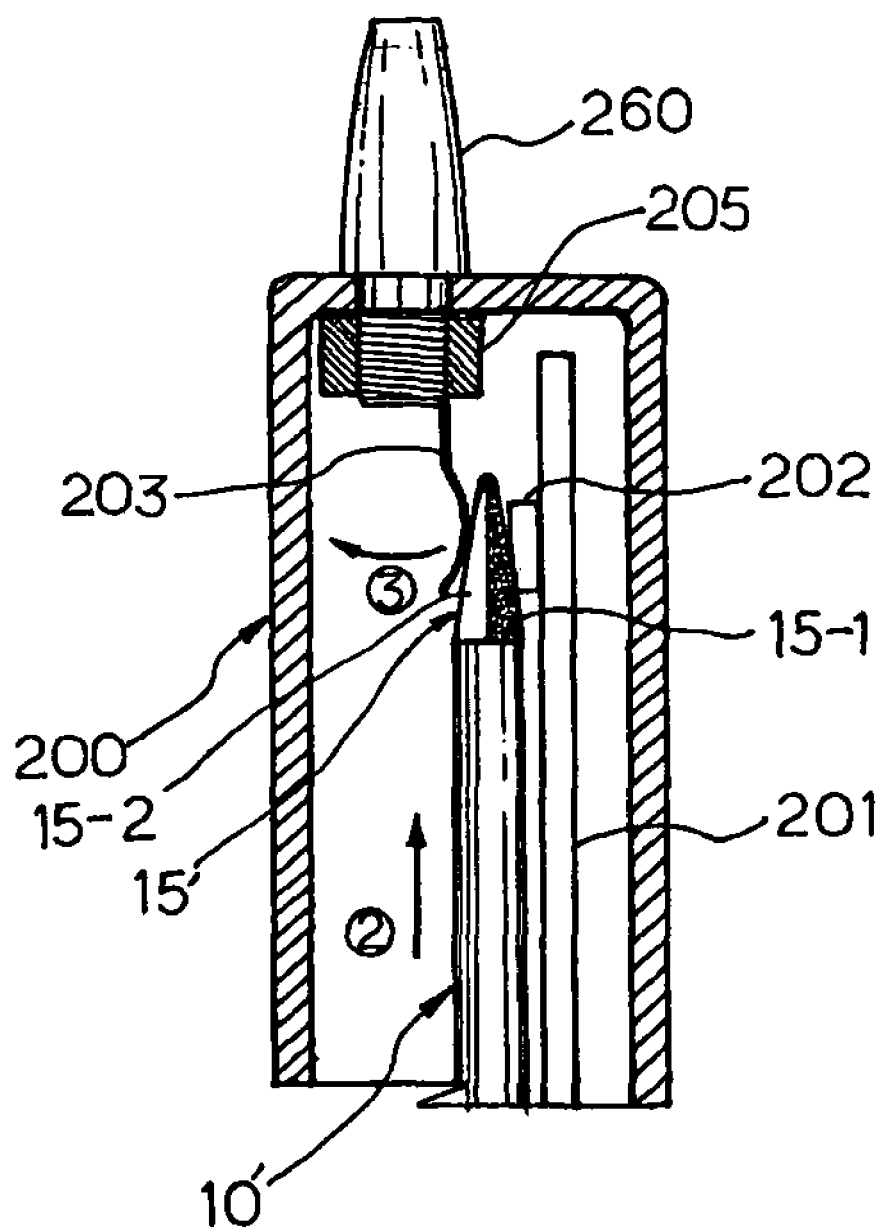
FIG. 5 is a side cut-away view showing a stylus pen after being completely inserted into a terminal according to another embodiment of the present invention.
Figure 6:
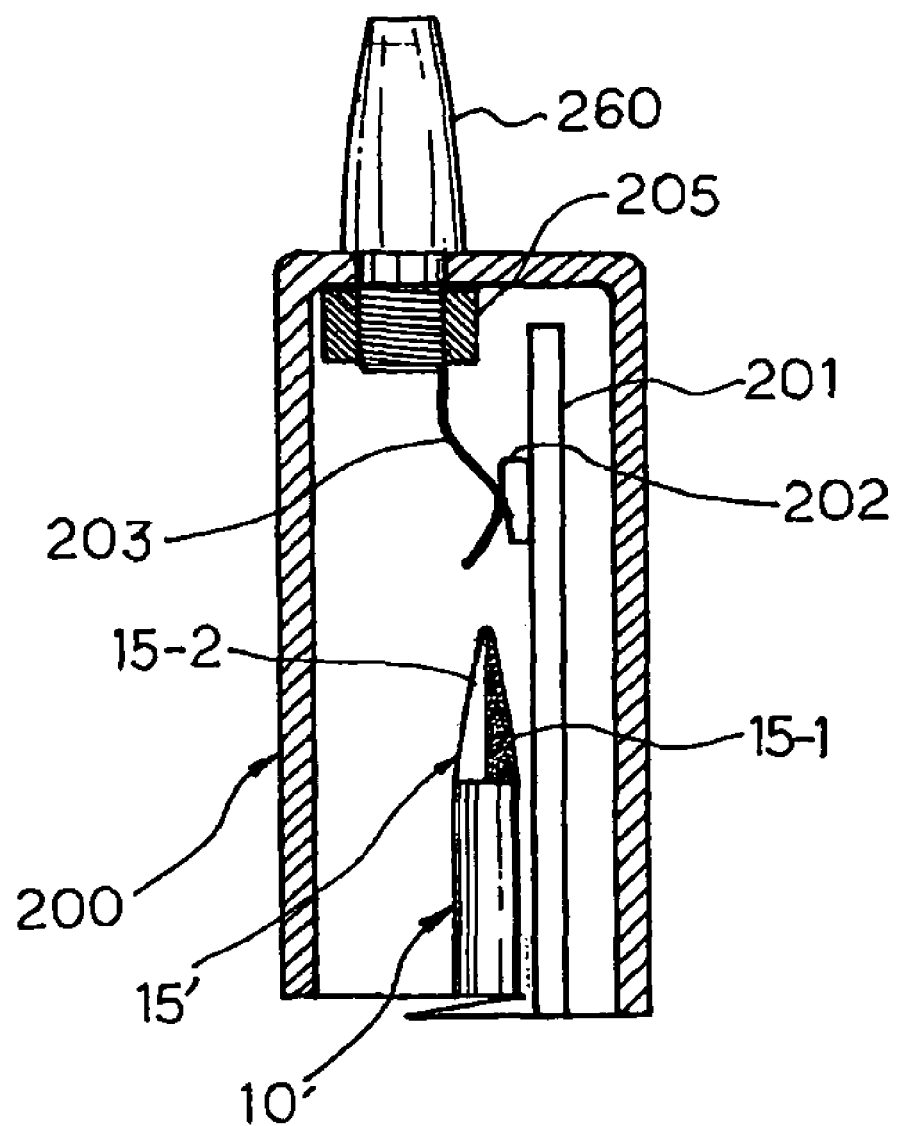
FIG. 6 is a side cut-away view showing a stylus pen depicted in FIG. 5 before being completely inserted into a terminal.

FIG. 5 is a side cut-away view showing a stylus pen after being completely inserted into a terminal according to another embodiment of the present invention, and FIG. 6 is a side cut-away view showing a stylus pen depicted in FIG. 5 before being completely inserted into a terminal.

Referring to FIGS. 5 and 6, there is provided a helical antenna 260 (terminal antenna) having the same structure as the helical antenna 160. A stopping element (not shown) for holding the completely inserted stylus pen is also employed in this embodiment. As shown in FIG. 6, a contact spring 203 makes direct contact with an antenna contact portion 202 of an RF board 201 of a terminal main body 200. When a stylus pen 10' is completely inserted into the main body 200, a tip 15' of the stylus pen 10' is inserted between the contact spring 203 and the antenna contact portion 202, as shown in FIG. 5. That is, the complete insertion of the stylus pen 10' in direction of arrow ② bends the contact spring 203 in the direction of arrow ③. Therefore, when the stylus pen 10' is completely inserted, the built-in antenna 20 in the stylus pen 10' operates as an antenna, and the helical terminal antenna 260 does not operate. As shown, the tip 15' of the stylus pen 10' includes a conductive board contact portion 15-1 and a nonconductive spring contact portion 15-2. When the stylus pen 10' is completely inserted in the main body 200, the board contact portion 15-1 makes conductive contact with the antenna contact portion 202 of the RF board 201, and the spring contact portion 15-2 makes nonconductive contact with the contact spring 203. Well-known guide elements are preferably incorporated to allow the stylus pen 10' to be inserted with the portions 15-1 and 15-2 oriented in proper directions, as described above.

As described above, the stylus pen of the present invention serves as an antenna when inserted in the terminal, such that the terminal can have an improved antenna radiation characteristic and quality when compared to conventional terminals they use only a terminal antenna.

The forgoing embodiments are merely exemplary and are not to be construed as limiting the present invention. The present teachings can be readily applied to other types of apparatus. The description of the present invention is intended to be illustrative, and not to limit the scope of the claims. Many alternatives, modifications, and variations will be apparent to those skilled in the art.

What is claimed is:

1. A stylus pen including a head end and a tip end opposite the head end for a portable wireless terminal having a terminal antenna, an RF (Radio Frequency) board, and a touch screen, the stylus pen comprising:

a hollow cylinder detachably disposed in the portable wireless terminal; and a built-in antenna installed in the hollow cylinder and electrically connected to the tip end, wherein when the stylus pen is completely inserted in the portable wireless terminal so that the head end abuts the portable wireless terminal, a conductive board contact portion of the tip end makes contact with an antenna contact portion of the RF board and a nonconductive spring contact portion of the tip end makes contact with a contact spring that is fixed to a conductive bushing of the terminal antenna and that is separated from the antenna contact portion by the tip end, such that the built-in antenna is electrically connected to the RF board and the terminal antenna is electrically disconnected from the RF board.

2. The stylus pen of claim 1, wherein the head end is disposed on a shaft extending and retracting in the hollow cylinder without interference with the built-in antenna.

3. The stylus pen of claim 2, wherein the stylus pen further comprises:

a tip used for touching the touch screen, the tip being electrically connected with the built-in antenna.

4. The stylus pen of claim 1, wherein the built-in antenna is one of a $\lambda/4$ dipole antenna and a $\lambda/4$ monopole antenna.

5. A method for improving antenna characteristics of a portable terminal having a terminal antenna, an RF (Radio Frequency) board, and a touch screen, the method comprising:

detachably disposing a stylus pen including a head end and a tip end opposite the head end in the portable terminal; and electrically connecting a built-in antenna electrically connected to the tip end of the stylus pen with the portable terminal by completely inserting the stylus pen in the terminal so that the head end abuts the portable terminal and a conductive board contact portion of the tip end makes contact with an antenna contact portion of the RF board and a nonconductive spring contact portion of the tip end makes contact with a contact spring that is fixed to a conductive bushing of the terminal antenna and that is separated from the antenna contact portion by the tip end, wherein the built-in antenna is electrically connected to the RF board and the terminal antenna is electrically disconnected from the RF board.

* * * * *